(12) United States Patent
Myung

(10) Patent No.: US 8,649,364 B2
(45) Date of Patent: Feb. 11, 2014

(54) HYBRID SUBCARRIER MAPPING METHOD AND SYSTEM

(75) Inventor: Hyung G. Myung, West New York, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 1028 days.

(21) Appl. No.: 12/524,076

(22) PCT Filed: Jan. 23, 2008

(86) PCT No.: PCT/US2008/051807
§ 371 (c)(1),
(2), (4) Date: Dec. 18, 2009

(87) PCT Pub. No.: WO2008/091951
PCT Pub. Date: Jul. 31, 2008

(65) Prior Publication Data
US 2013/0010703 A1    Jan. 10, 2013

Related U.S. Application Data

(60) Provisional application No. 60/886,185, filed on Jan. 23, 2007.

(51) Int. Cl.
*H04B 7/208* (2006.01)
(52) U.S. Cl.
USPC .......................................... 370/344; 370/480
(58) Field of Classification Search
None
See application file for complete search history.

(56) References Cited

U.S. PATENT DOCUMENTS

| 7,042,957 | B1 | 5/2006 | Zirwas |
| 2006/0291470 | A1 | 12/2006 | Khandekar et al. |
| 2007/0004465 | A1* | 1/2007 | Papasakellariou et al. ... 455/571 |
| 2007/0171889 | A1* | 7/2007 | Kwon et al. .................. 370/350 |
| 2008/0123616 | A1* | 5/2008 | Lee ............................... 370/344 |
| 2009/0180459 | A1* | 7/2009 | Orlik et al. .................... 370/344 |

FOREIGN PATENT DOCUMENTS

WO    2006/116617 A1    11/2006

* cited by examiner

*Primary Examiner* — Chirag Shah
*Assistant Examiner* — Jenkey Van
(74) *Attorney, Agent, or Firm* — Laurence P. Colton; Smith Risley Tempel Santos LLC

(57) ABSTRACT

A method and system of accommodating different mapping schemes in a transmission using an orthogonal direct sequence spread spectrum technique in which input data to a transmitter is spread by conversion into a sequence of complex numbers modulated for N-point discrete Fourier transform (N-point DFT), subcarrier mapping, M-point inverse discrete Fourier transform (M-point IDFT), and cyclic prefix (CP) insertion; the spread and modulated data is transmitted to and received by a receiver; and the received data is despread demodulated for cyclic prefix (CP) removal, M-point discrete Fourier transform (M-point DFT), subcarrier demapping and equalization, and N-point inverse discrete Fourier transform (N-point IDFT).

9 Claims, 6 Drawing Sheets

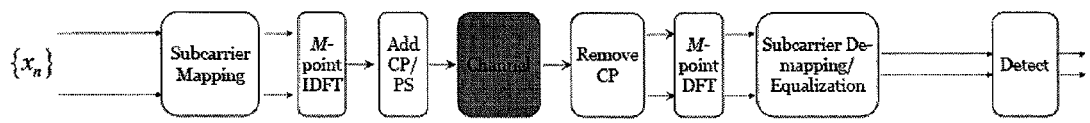
* CP: Cyclic Prefix, PS: Pulse Shaping, $M > N$
FIG. 1 – PRIOR ART
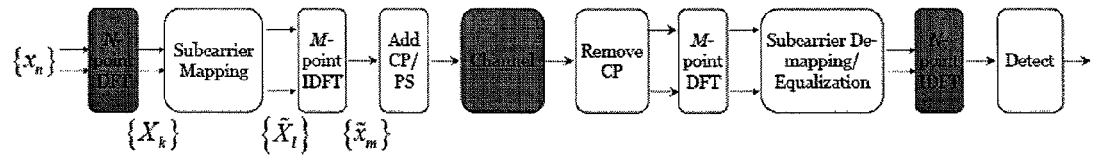
* CP: Cyclic Prefix, PS: Pulse Shaping, $M > N$
FIG. 2 – PRIOR ART

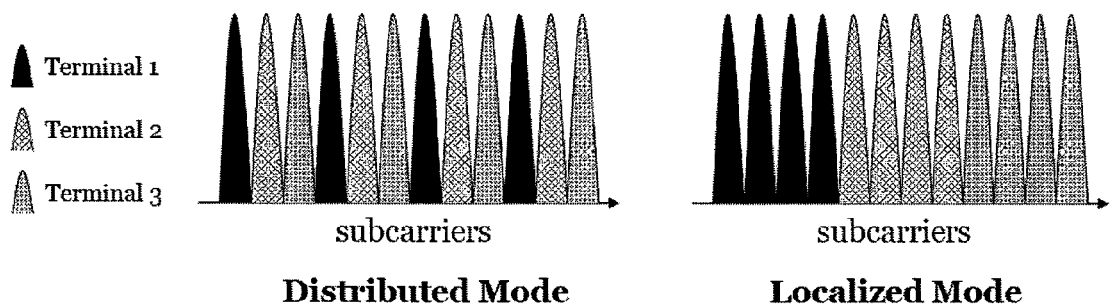
FIG. 3 – PRIOR ART
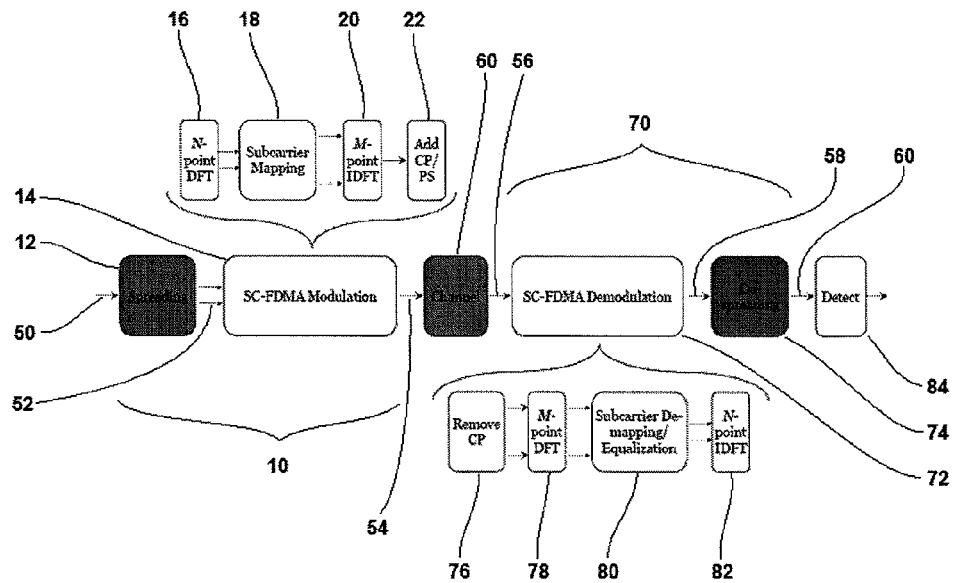
FIG. 4

- M (Total subcarriers) = 8, N (Data block size) = 2

SC-FDMA

Q (# of users) = 4

SC-CFDMA

Q (# of users) = $Q_{code} \times Q_{frequency}$ = 2 x 2 = 4

HYBRID SUBCARRIER MAPPING METHOD AND SYSTEM

STATEMENT OF RELATED APPLICATIONS

This patent application is based on and claims priority on United States of America Provisional Patent Application No. 60/886,185 having a filing date of 23 Jan. 2007, which is incorporated herein by this reference.

BACKGROUND OF THE INVENTION

1. Technical Field

The present invention is generally directed to a method and system to accommodate multiple mapping schemes in a single carrier frequency division multiple access (SC-FDMA) system. The present invention is more specifically directed to the use of an orthogonal direct sequence spread spectrum technique to accommodate different mapping schemes, and to a technique to be applied as part of creating a single carrier code-frequency division multiple access (SC-CFDMA) system that accommodates localized and distributed mapping schemes.

2. Related Art

Currently, several wireless communication standards use orthogonal frequency division multiplexing (OFDM) and orthogonal frequency division multiple access (OFDMA) to achieve high bit rates. In these approaches, a signal is "spread out" and distributed among subcarriers, which send portions of the signal in parallel. The subcarrier frequencies are chosen so that the modulated data streams are orthogonal to each other, such that cross-talk between the sub-channels is eliminated and inter-carrier guard bands are not required. The receiving end reassembles the portions that were sent in parallel. FIG. 1 is a flow chart of transmission and reception within an OFDMA system. OFDM and OFDMA systems suffer from a high peak-to-average power ratio (PAPR), a need for an adaptive or coded scheme to overcome spectral nulls in the channel, and high sensitivity to carrier frequency offset.

SC-FDMA overcomes some of the problems present in OFDM and OFDMA systems by performing a Fourier transform on the signal and then using subcarriers to send it through a serial transmission rather than in parallel. On reception of the transmission, an inverse Fourier transform is performed. FIG. 2 is flow chart of this process. Although SC-FDMA offers a lower PAPR than do OFDM and OFDMA, its effectiveness is limited by the choice of mapping scheme employed. Two approaches exist for SC-FDMA systems to apportion subcarriers among terminals. In localized SC-FDMA (LFDMA), each terminal uses a set of adjacent subcarriers to transmit its symbols. Thus, the bandwidth of a LFDMA transmission is confined to a fraction of the system bandwidth. LFDMA can potentially achieve multi-user diversity in the presence of frequency selective fading if it assigns each user to subcarriers in a portion of the signal band where that user has favorable transmission characteristics. The alternative approach is distributed SC-FDMA, wherein the subcarriers assigned to a terminal are spread over the entire signal band. This approach is robust against frequency selective fading because information is spread across the entire signal band. One realization of distributed SC-FDMA is interleaved FDMA (IFDMA) where occupied subcarriers are equidistant from each other.

FIG. 3 is a comparison of the two mapping schemes. In this figure, three terminals are present, each transmitting symbols on four subcarriers in a system with a total of twelve subcarriers. With LFDMA, terminal 1 uses subcarriers 0, 1, 2, and 3; in the distributed scheme, terminal 1 uses subcarriers 0, 3, 6, and 9.

This current SC-FDMA approach is flawed in certain respects. For example, conventional SC-FDMA cannot efficiently accommodate both distributed and localized mapping schemes for different simultaneous mobile users, or for a relatively stationary user and a highly mobile user, because subcarriers must not overlap.

Accordingly, there is a need for a method and system that accommodates the transmission of localized and distributed mapping schemes so as to take advantage of the strengths of each scheme. There also is a need for a method and system that accommodates a plurality of simultaneous mobile signals and a relatively stationary signal concurrently with a highly mobile signal. It is to these needs and others that the present invention is directed.

BRIEF SUMMARY OF THE INVENTION

The present invention provides a method that accommodates localized and distributed subcarrier mappings. The invention accommodates both mappings through use of an orthogonal direct sequence spread spectrum technique.

Briefly, in the process, the transmitter performs spreading, in which a binary input signal is converted into a sequence of complex numbers, $x_n$, in one of several possible modulation formats. The system adapts the modulation format, and thereby the transmission bit rate, to match the current channel conditions of each terminal. The transmitter next groups the modulation symbols, $x_n$, into blocks, each of which contain N symbols.

The first step in modulating the SC-FDMA subcarriers is to perform an N-point discrete Fourier transform (DFT) to produce a frequency domain representation of the input symbols. The transmitter then maps each of the N-point DFT outputs, in conjunction with $Q_{code}$ and $Q_{frequency}$ values to one of the M (>N) orthogonal subcarriers that can be transmitted. A typical value of M is 256 subcarriers, and N=M/Q is an integer multiple of M. Q is the bandwidth expansion factor of the symbol sequence. If all terminals transmit N symbols per block, the system can handle Q simultaneous transmissions without co-channel interference. Q also equals $Q_{code} \times Q_{frequency}$, where $Q_{code}$ references the number of code sets available and $Q_{frequency}$ refers to the number of frequency sets available to each code. The $Q_{code}$ differentiates symbols in separate mapping schemes. The result of the subcarrier mapping is a set of complex subcarrier amplitudes.

An M-point inverse DFT (IDFT) transforms the subcarrier amplitudes to a complex time domain signal. Each such complex time domain signal then modulates a single frequency carrier, and the modulated symbols are ultimately transmitted sequentially.

A receiver transforms the received signal into the frequency domain via M-point DFT, de-maps the subcarriers, and then performs the frequency domain equalization. This equalization is necessary to combat the intersymbol interference caused by the modulation using a single carrier. The equalized symbols are transformed back into the time domain via the N-point IDFT, and detection and decoding take place in the time domain.

Benefits of the new method over the old SC-FDMA method include the coexistence of the localized and distributed mapping schemes and higher cell and wireless broadband transmission capacity.

BRIEF DESCRIPTION OF THE DRAWINGS

The invention may be more completely understood in consideration of the following detailed description of various embodiments of the invention in connection with the accompanying drawings, which are as follows.

FIG. 1 is a flow chart of a prior art OFDMA system.

FIG. 2 is a flow chart of a prior art SC-FDMA system.

FIG. 3 is a comparison of the distributed mapping scheme and the localized mapping scheme for SC-FDMA systems.

FIG. 4 is a flow chart of a SC-CFDMA system according to the invention.

DETAILED DESCRIPTION OF PREFERRED EMBODIMENTS

Figure 5:
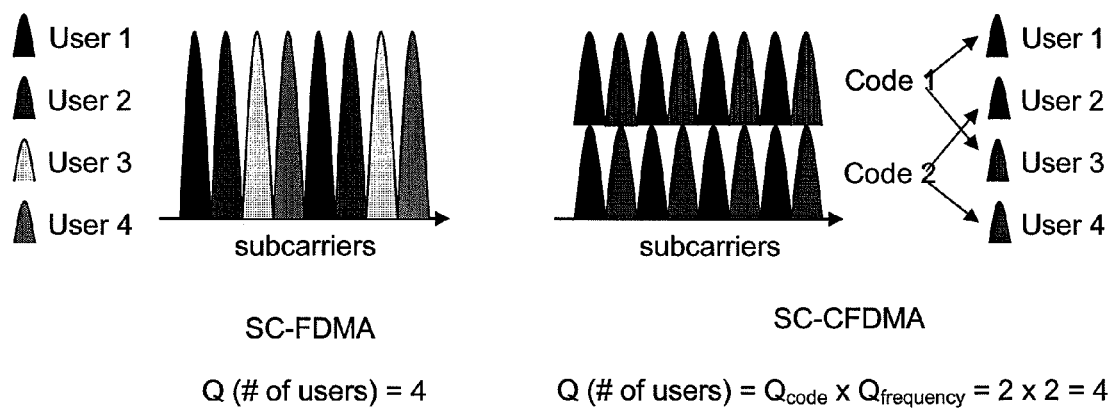
FIG. 5 is an application of the invention in a comparison with the prior art.

FIG. 1 is a flow chart of a prior art OFDMA system and FIG. 2 is a flow chart of a prior art SC-FDMA system for comparison purposes to the present invention. FIG. 3 is a comparison of the distributed mapping scheme and the localized mapping scheme for SC-FDMA systems.

FIG. 4 is a flow chart of an embodiment of the invention through an SC-CFDMA system. To begin the process, the transmitter 10 comprises a spreader 12 and an SC-FDMA modulation unit 14. Input data 50 to the spreader 12 is spread in a conventional manner, in which a binary input signal is converted into a sequence of complex numbers, $x_n$, in one of several possible modulation formats. The system adapts the modulation format, and thereby the transmission bit rate, to match the current channel conditions of each terminal. The spread data 52 then is sent to the SC-FDMA modulation unit 14.

The transmitter next groups the modulation symbols, $x_n$, into blocks, each of which contain N symbols. The SC-FDMA modulation unit 14 comprises modules or subroutines for N-point discrete Fourier transform (N-point DFT) 16, subcarrier mapping 18, M-point inverse discrete Fourier transform (M-point IDFT) 20, and cyclic prefix (CP) insertion 22. The first step in modulating the SC-FDMA subcarriers is to perform an N-point DFT 16 to produce a frequency domain representation of the input symbols. The transmitter 10 then maps each of the N-point DFT outputs using subcarrier mapping 18, in conjunction with $Q_{code}$ and $Q_{frequency}$ values discussed further below, to one of the M (>N) orthogonal subcarriers that can be transmitted, with the M-point IDFT 20. The M-point IDFT 20 transforms the subcarrier amplitudes to a complex time domain signal. Each such complex time domain signal then modulates a single frequency carrier, and the modulated symbols are ultimately transmitted sequentially.

A typical value of M is 256 subcarriers, and N=M/Q is an integer multiple of M. Q is the bandwidth expansion factor of the symbol sequence. If all terminals transmit N symbols per block, the system can handle Q simultaneous transmissions without co-channel interference. Q also equals $Q_{code} \times Q_{frequency}$, where $Q_{code}$ references the number of codes sets available and $Q_{frequency}$ refers to the number of frequency sets available to each code. The $Q_{code}$ differentiates symbols in separate mapping schemes. The result of the subcarrier mapping is a set of complex subcarrier amplitudes.

The transmitter 10 can perform two other signal processing operations prior to transmission. It can insert a set of symbols referred to as a cyclic prefix (CP) insertion 22 in order to provide guard time to prevent inter-block interference (IBI) due to multipath propagation. It also can perform a linear filtering operation referred to as pulse shaping in order to reduce out-of-band signal energy. In general, CP is a copy of the last part of the block, which is added at the start of each block for multiple reasons. First, CP acts as a guard time between successive blocks. If the length of the CP is longer than the maximum delay spread of the channel, or roughly, the length of the channel impulse response, then there is no IBI. Second, since CP is a copy of the last part of the block, it converts a discrete time linear convolution into a discrete time circular convolution. Thus, transmitted data propagating through the channel can be modeled as a circular convolution between the channel impulse response and the transmitted data block, which in the frequency domain is a point-wise multiplication of the DFT frequency samples. Then, to remove the channel distortion, the DFT of the received signal can simply be divided by the DFT of the channel impulse response point-wise, or a more sophisticated frequency domain equalization technique can be implemented.

The data or signal 54 exiting the SC-FDMA modulation unit 14 is transmitted from the transmitter 10 as transmission data or signal 56 via channel 60.

A receiver 70 comprises an SC-FDMA demodulation unit 72 and a despreader 74. The demodulation unit 72 comprises modules or subroutines for cyclic prefix (CP) removal 76, M-point discrete Fourier transform (M-point DFT) 78, subcarrier demapping and equalization 80, and N-point inverse discrete Fourier transform (N-point IDFT) 82. The SC-FDMA demodulation unit 72 removes the cyclic prefix (CP) 76 from the received transmission or data signal 56, transforms the signal 56 into the frequency domain via M-point DFT 78, demaps the subcarriers 80. After demapping the subcarriers, the receiver 70 performs the frequency domain equalization. This equalization is necessary to combat the intersymbol interference caused by the modulation using a single carrier. The equalized symbols are transformed back into the time domain via the N-point IDFT 82 resulting in demodulized data 58.

The demodulized data 58 is despread in a conventional manner in despreader 74, and the despread data 60 is detected 84 and decoded in the time domain.

FIG. 5 is an application of the present SC-CFDMA invention that compares it to the SC-FDMA prior art in terms of occupied subcarriers for the same number of users. The SC-FDMA example demonstrated distributed mapping for four users. Through the use of an orthogonal sequence spread spectrum technique with different mappings, the SC-CFDMA example uses two codes over two frequencies to accommodate the same four users.

Single carrier frequency division multiple access (SC-FDMA), which utilizes single carrier modulation and frequency domain equalization is a technique that has similar performance and essentially the same overall complexity as those of OFDMA system. One prominent advantage over OFDMA is that the SC-FDMA signal has lower PAPR because of its inherent single carrier structure. SC-FDMA has drawn great attention as an attractive alternative to OFDMA, especially in the uplink communications where lower PAPR greatly benefits the mobile terminal in terms of transmit power efficiency. It is currently a strong candidate for uplink multiple access scheme in Long Term Evolution (LTE) phase of 3GPP (Evolved UTRA). FIG. 1 illustrates a transmitter and receiver structure of an OFDMA system, and FIG. 2 illustrates a transmitter and receiver structure of an SC-FDMA system.

The transmitter of an SC-FDMA system converts a binary input signal to a sequence of modulated subcarriers. A block is the time used to transmit all of subcarriers once. The transmitter next groups the modulation symbols into blocks each containing N symbols. The first step in modulating the SC-FDMA subcarriers is to perform an N-point discrete Fourier transform (DFT), to produce a frequency domain representation of the input symbols. It then maps each of the N DFT outputs to one of the M orthogonal subcarriers that can be transmitted. If all terminals transmit N symbols per block which is an integer submultiple of M, the system can handle Q simultaneous transmissions without co-channel interference, where Q is M/N. The result of the subcarrier mapping is the set of complex subcarrier amplitudes, where N of the amplitudes are non-zero. As in OFDMA, an M-point inverse DFT (IDFT) transforms the subcarrier amplitudes to a complex time domain signal.

Figure 6:
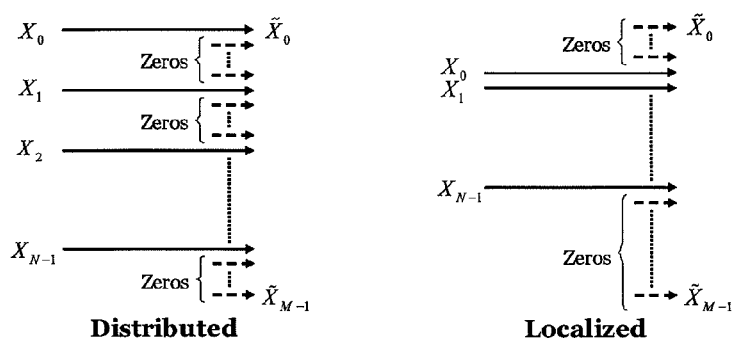
FIG. 6 illustrates two subcarrier mapping schemes, distributed and localized.
Figure 7:
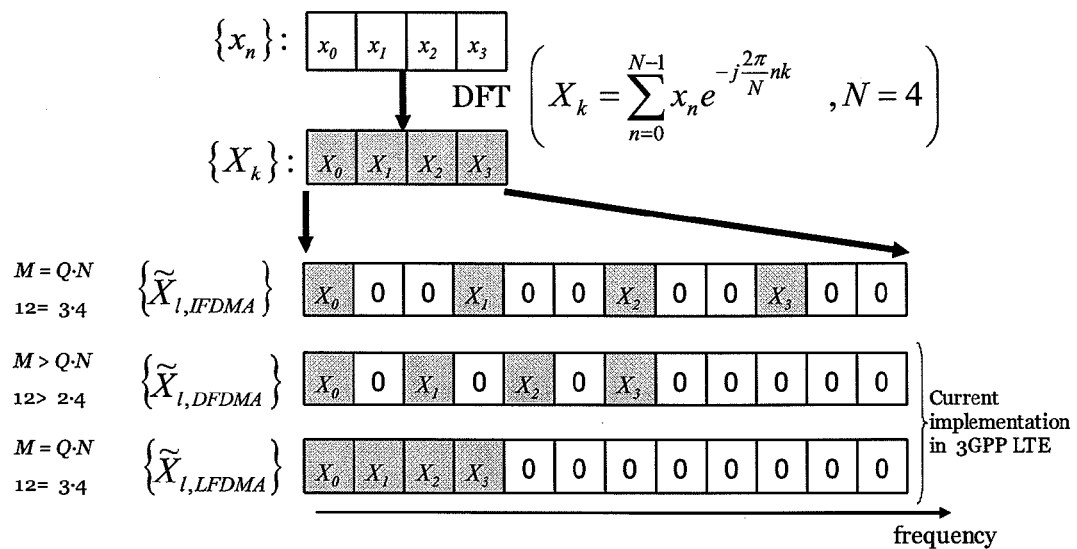
FIG. 7 is a subcarrier mapping scheme.

There are two methods to choose the subcarriers for transmission as shown in FIG. 6. In the distributed subcarrier mapping mode, DFT outputs of the input data are allocated over the entire bandwidth with zeros occupying in unused subcarriers, whereas consecutive subcarriers are occupied by the DFT outputs of the input data in the localized subcarrier mapping mode. The distributed subcarrier mapping mode of SC-FDMA is referred to as distributed FDMA (DFDMA) herein and the localized subcarrier mapping mode of SC-FDMA is referred to as localized FDMA (LFDMA) herein. The case of M=Q·N for the distributed mode with equidistance between occupied subcarriers is called Interleaved FDMA (IFDMA). An example of SC-FDMA transmit symbols in the frequency domain for N=4, Q=3 and M=12 is illustrated in FIG. 7 and FIG. 3.

Figure 8:
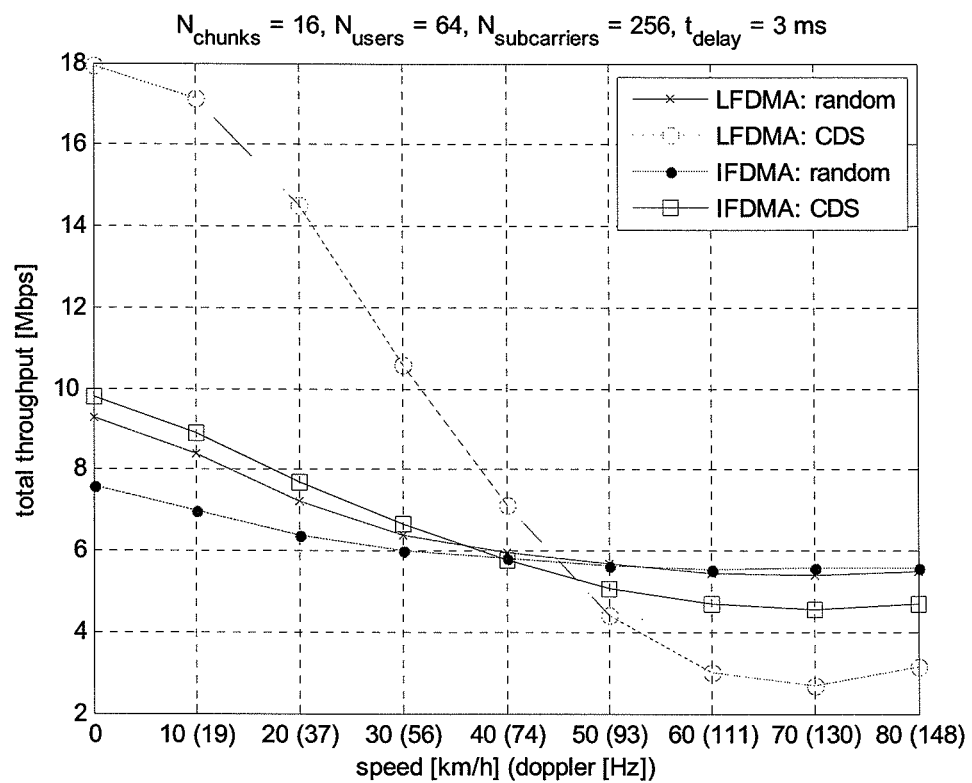
FIG. 8 is a chart of the total data throughput for different resource scheduling schemes in which the total number of users is 64 and channel information feedback delay is 3 ms.

As can be seen from FIG. 8, localized subcarrier mapping yields much higher throughput for low speed users when channel-dependent scheduling (CDS) is applied. However, the throughput of LFDMA with CDS becomes lower when the users are moving at high speed. In this situation, random scheduling, such as static round robin scheduling, using distributed subcarrier mapping is advantageous since it requires no overhead and no computation. Thus, localized subcarrier mapping with CDS is more advantageous for low mobility users and distributed subcarrier mapping, such as IFDMA with static scheduling, is better for users with high mobility. Also, IFDMA has an additional advantage in PAPR. When there are low mobility users and high mobility users at the same, accommodating both types of subcarrier mapping can lead to higher data and cell capacity.

Figure 9:
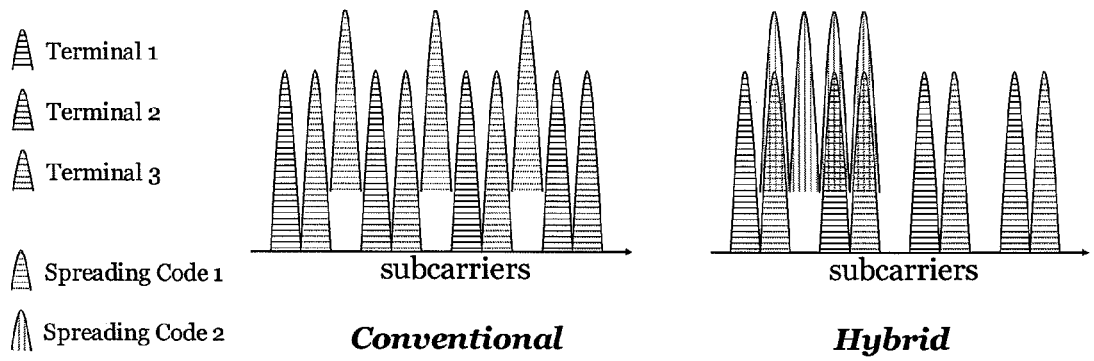
FIG. 9 illustrates using an orthogonal direct sequence spread spectrum technique prior to SC-FDMA modulation such that both distributed and localized mapping can coexist with overlapping subcarriers.

Conventional SC-FDMA cannot efficiently accommodate both distributed and localized mapping schemes since to maintain orthogonality among users, subcarriers must not overlap. However, according to the present invention, using orthogonal direct sequence spread spectrum technique prior to SC-FDMA modulation, both mapping can coexist with overlapping subcarriers as illustrated in FIG. 9, resulting in the single carrier code-frequency division multiple access (SC-CFDMA) of the present invention, and the block diagram for the SC-CFDMA of the present invention is shown in FIG. 4.

Figure 10:
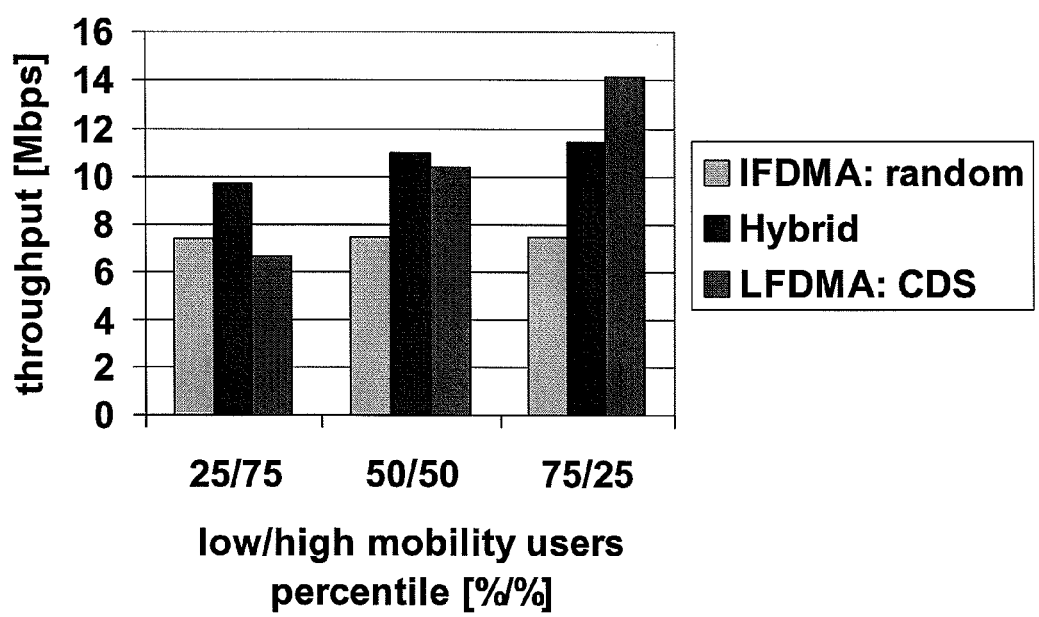
FIG. 10 is a chart than compares the total throughput between hybrid subcarrier mapping method and other conventional subcarrier mapping methods.

FIG. 10 illustrates the results of a simulation that compares the total aggregate throughput between the hybrid subcarrier mapping method of the present invention and other conventional subcarrier mapping methods when CDS is applied. The simulation results shown in FIG. 10 are for hybrid scheduling, with static round robin scheduling for high mobility users using IFDMA (IFDMA: static) and CDS for low mobility users using LFDMA (LFDMA: CDS). The simulation comprised 2000 iterations of 64 total users, 16 subcarriers per chunk, and 16 total chunks. More specifically, the total number of subcarriers is M=256, the number of chunks is Q=16, the number of subcarriers per chunk is N=16, the total number of users is K=64, and the feedback delay is 3 ms. Low mobility users have velocity of 3 km/h and high mobility users have velocity of 60 km/h. In FIG. 10, the label 'X/Y' on the X-axis means that X-percentile of the users have low mobility and Y-percentile of the users have high mobility. Clearly, when high mobility users are the majority of the entire users (the graphs labeled '25/75' and '50/50'), hybrid subcarrier mapping scheme yields higher data throughput than the conventional subcarrier mapping schemes.

The foregoing detailed description of the preferred embodiments and the appended figures have been presented only for illustrative and descriptive purposes and are not intended to be exhaustive or to limit the scope and spirit of the invention. The embodiments were selected and described to best explain the principles of the invention and its practical applications. One of ordinary skill in the art will recognize that many variations can be made to the invention disclosed in this specification without departing from the scope and spirit of the invention.

What is claimed is:

1. A system for hybrid subcarrier mapping of data, comprising:
    a) a transmitter comprising a spreader and a single carrier frequency division multiple access (SC-FDMA) modulation unit, wherein input data is spread by conversion into a sequence of complex numbers in the spreader and then sent to the SC-FDMA modulation unit for modulation, and wherein the SC-FDMA modulation unit comprises modules or subroutines for N-point discrete Fourier transform (N-point DFT), subcarrier mapping, M-point inverse discrete Fourier transform (M-point IDFT), and cyclic prefix (CP) insertion;
    b) a receiver comprising a despreader and an SC-FDMA demodulation unit, wherein received data is demodulated in the SC-FDMA demodulation unit and despread in the despreader, and wherein the demodulation unit comprises modules or subroutines for cyclic prefix (CP) removal, M-point discrete Fourier transform (M-point DFT), subcarrier demapping and equalization, and N-point inverse discrete Fourier transform (N-point IDFT); and
    c) at least one channel over which data is transmitted, wherein the input data acted upon by the transmitter is transmitted from the transmitter as transmission data via the at least one channel and is the received data that is received by the receiver,
    wherein the system adapts the modulation format and the transmission bit rate to match current channel conditions;
    wherein the SC-FDMA modulates the input data by:
        performing an N-point DFT to produce a frequency domain representation of the input data;
        mapping each of the N-point DFT outputs to a subcarrier in conjunction with $Q_{code}$ and $Q_{fre\,uenc}$ values to one of M(>N)orthogonal subcarriers;
        performing an M-point IDFT to transform the subcarrier amplitudes to a complex time domain signal;

using each such complex time domain signal to modulate a single frequency carrier; and transmitting the modulated symbols sequentially; and wherein:

M is 256 subcarriers;

N=M/Q is an integer multiple of M;

Q is the bandwidth expansion factor of the symbol sequence and Q also equals $Q_{code} \times Q_{frequency}$;

$Q_{code}$ references the number of code sets available; and $Q_{frequency}$ refers to the number of frequency sets available to each code.

2. The system as claimed in claim 1, wherein the transmitter further:

a) inserts a set of symbols referred to as a cyclic prefix (CP) insertion in order to provide guard time to prevent inter-block interference (IBI) due to multipath propagation, wherein CP is a copy of the last part of the block, which is added at the start of each block; and b) performs a linear filtering operation referred to as pulse shaping in order to reduce out-of-band signal energy.

3. The system as claimed in claim 2, wherein the SC-FDMA demodulation unit demodulates the received data by:

a) removing the cyclic prefix (CP) from the received data signal;

b) transforming the received data signal into the frequency domain by performing an M-point DFT;

c) demapping the subcarriers;

d) performing a frequency domain equalization; and e) transforming the equalized symbols back into the time domain by performing an N-point IDFT.

4. The system as claimed in claim 3, wherein the data is wireless broadband transmissions.

5. A method for transmitting and receiving data using hybrid subcarrier mapping comprising the steps of:

a) in a transmitter:

i) spreading input data by conversion into a sequence of complex numbers;

ii) performing an N-point DFT to produce a frequency domain representation of the input data;

iii) mapping each of the N-point DFT outputs to a subcarrier in conjunction with $Q_{code}$ and $Q_{frequency}$ values to one of M (>N) orthogonal subcarriers;

iv) performing an M-point IDFT to transform the subcarrier amplitudes to a complex time domain signal;

v) using each such complex time domain signal to modulate a single frequency carrier; and vi) transmitting the modulated symbols sequentially over at least one channel; and b) in a receiver:

i) removing the cyclic prefix (CP) from the received data signal;

ii) transforming the received data signal into the frequency domain by performing an M-point DFT;

iii) demapping the subcarriers;

iv) performing a frequency domain equalization;

v) transforming the equalized symbols back into the time domain by performing an N-point IDFT; and vi) dispreading the received data signal, wherein:

M is 256 subcarriers;

N=M/Q is an integer multiple of M;

Q is the bandwidth expansion factor of the symbol sequence and Q also equals $Q_{code} \times Q_{frequency}$;

$Q_{code}$ references the number of code sets available; and $Q_{frequency}$ refers to the number of frequency sets available to each code.

6. The method as claimed in claim 5, further comprising the steps of:

a) inserting into the input data a set of symbols referred to as a cyclic prefix (CP) insertion in order to provide guard time to prevent inter-block interference (IBI) due to multipath propagation, wherein CP is a copy of the last part of the block, which is added at the start of each block; and b) performs a linear filtering operation referred to as pulse shaping on the input data in order to reduce out-of-band signal energy.

7. The system as claimed in claim 6, wherein the data is wireless broadband transmissions.

8. A system for accommodating localized and distributed subcarrier mappings, the system comprising:

a) a transmitter; and b) a receiver, wherein:

A) the transmitter performs spreading, in which a binary input signal is converted into a sequence of complex numbers, $x_n$, in one of several possible modulation formats;

B) the system adapts the modulation format, and thereby the transmission bit rate, to match the current channel conditions of each terminal;

C) the transmitter next groups the modulation symbols, $x_n$, into blocks, each of which contain N symbols;

D) the first step in modulating the SC-FDMA subcarriers is to perform an N-point discrete Fourier transform (DFT) to produce a frequency domain representation of the N symbols;

E) the transmitter then maps each of the N DFT outputs, in conjunction with $Q_{code}$ and $Q_{frequency}$ values to one of the M (>N) orthogonal subcarriers that can be transmitted, wherein a typical value of M is 256 subcarriers, N=M/Q is an integer multiple of M, Q is the bandwidth expansion factor of the symbol sequence, whereby if all terminals transmit N symbols per block, the system can handle Q simultaneous transmissions without co-channel interference, Q also equals $Q_{code} \times Q_{frequency}$, where $Q_{code}$ references the number of code sets available and $Q_{frequency}$ refers to the number of frequency sets available to each code and the $Q_{code}$ differentiates symbols in separate mapping schemes, whereby the result of the subcarrier mapping is a set of complex subcarrier amplitudes;

F) an M-point inverse DFT (IDFT) transforms the subcarrier amplitudes to a complex time domain signal and each such complex time domain signal then modulates a single frequency carrier, and the modulated symbols are ultimately transmitted sequentially;

G) the receiver transforms the received signal into the frequency domain via M-point DFT, de-maps the subcarriers, and then performs the frequency domain equalization, wherein this equalization is necessary to combat the intersymbol interference caused by the modulation using a single carrier; and H) the equalized symbols are transformed back into the time domain via the N-point IDFT, and detection and decoding take place in the time domain.

9. The system as claimed in claim 8, wherein the data is wireless broadband transmissions.

* * * * *